G. H. BOWEN, Jr.
DIFFERENTIAL PRESSURE MECHANISM.
APPLICATION FILED SEPT. 14, 1915.
1,236,399.
Patented Aug. 14, 1917.
2 SHEETS—SHEET 1.
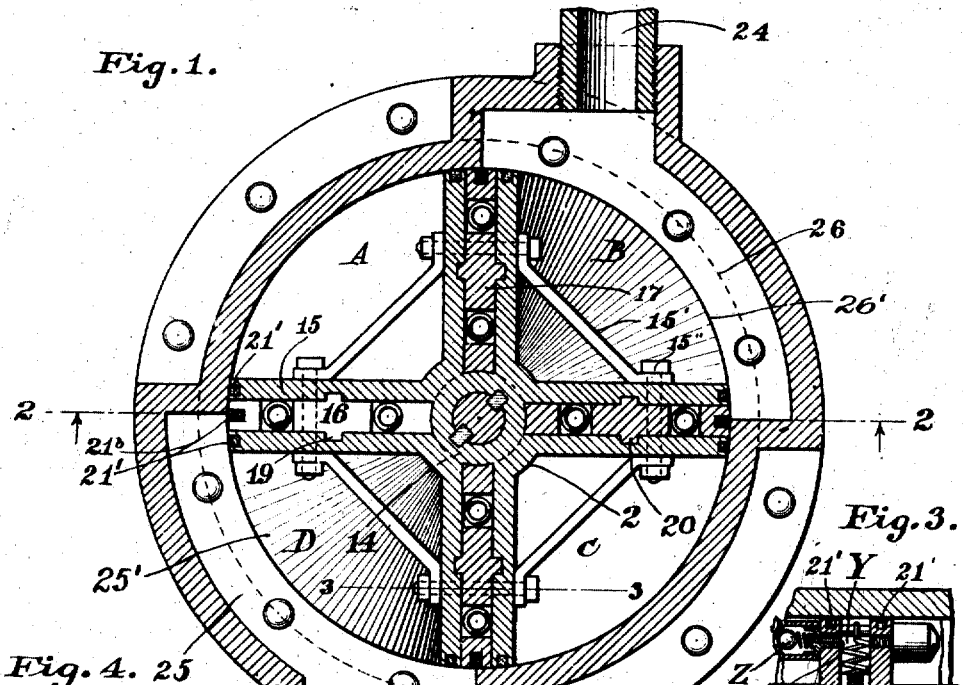
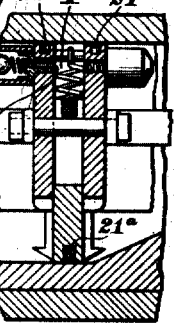
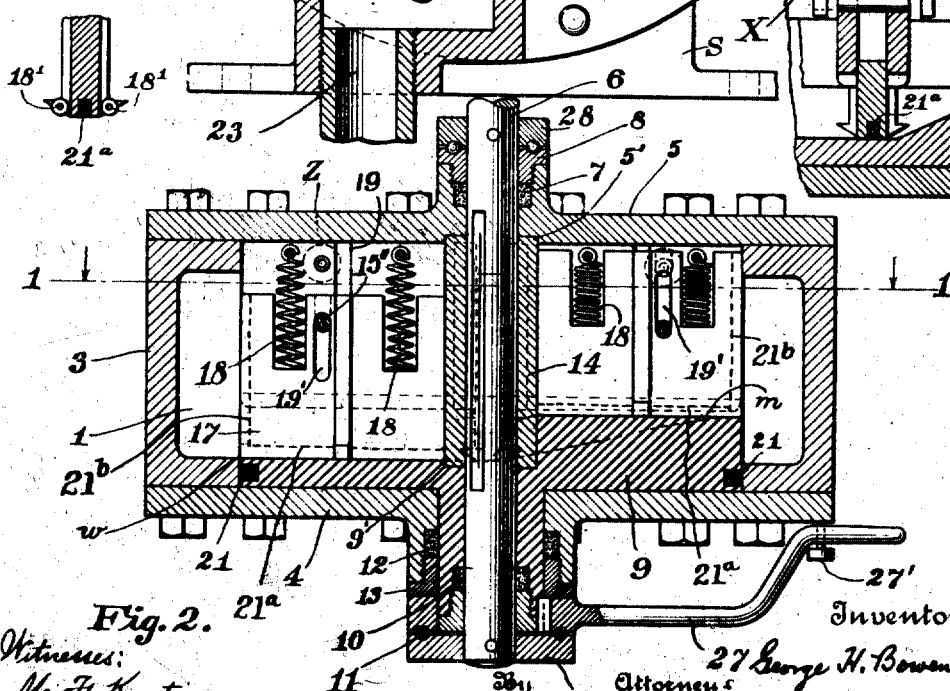
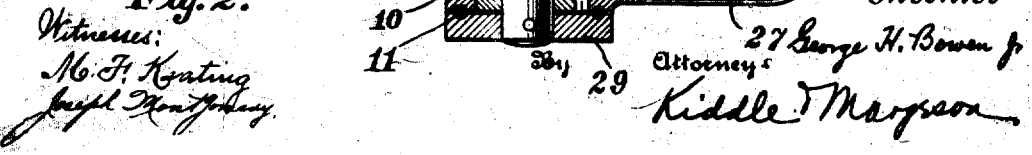
Witnesses:
M. F. Keating
Joseph Montgomery
Inventor
George H. Bowen Jr.
Attorneys
Kiddle & Margeson G. H. BOWEN, Jr.
DIFFERENTIAL PRESSURE MECHANISM.
APPLICATION FILED SEPT. 14, 1915.

1,236,399.

Patented Aug. 14, 1917.
2 SHEETS—SHEET 2.

Inventor
George H Bowen Jr
his Attorneys
Kiddle & Margison

UNITED STATES PATENT OFFICE.

GEORGE H. BOWEN, JR., OF TORONTO, ONTARIO, CANADA.

DIFFERENTIAL-PRESSURE MECHANISM.

1,236,399.  Specification of Letters Patent.  Patented Aug. 14, 1917.

Application filed September 14, 1915. Serial No. 50,561.

*To all whom it may concern:*

Be it known that I, GEORGE H. BOWEN, Jr., a citizen of the Dominion of Canada, and a subject of the King of England, residing at No. 20 Tennis Crescent, in the city of Toronto, county of York, Province of Ontario, Dominion of Canada, have invented certain new and useful Improvements in Differential-Pressure Mechanism, of which the following is a specification.

The object of the invention is to provide a cheap, simple and efficient mechanism for use in the class of machines that are operated by liquid or other fluids or through which liquid or other fluids pass.

The invention is directed to a mechanism in which there is comprised a stationary member and a rotor having projecting vanes, the areas of which are automatically varied to present different areas to a fluid engaging them as the rotor revolves. Such a mechanism can be utilized as a substitute for many mechanisms which depend upon the well known cylinder and piston or in place of mechanisms that depend upon the common rotor and stator of the present day turbine.

The invention is applicable to such machines, for example, as steam engines, steam turbines, steam meters, steam pumps, water engines and motors, water turbines, water or other liquid meters, pumps, gas or air engines, gas and air meters, gas or air pumps, and gas or air compressors.

As showing certain specific embodiments of the invention reference is made to the drawings forming a part of the specification and in which drawings, Figure 1 shows a horizontal sectional view of a mechanism embodying my invention. This is a view taken as on the line 1—1 of Fig. 2.

Fig. 2 is a vertical sectional view of the same mechanism taken as on the line 2—2 of Fig. 1.

Fig. 3 is a vertical sectional view taken as on the broken line 3—3 of Fig. 1.

Fig. 4 is a detail view of a part of one of the vanes.

Like reference characters refer to like parts both in the drawings and in the specification.

Figure 6:
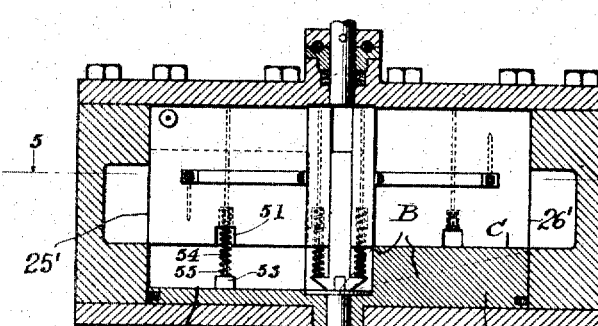
Fig. 6 is a vertical sectional view of the mechanism shown in Fig. 5, and is a view taken as on the line 6—6 of Fig. 5.

The machine shown in Figs. 1 to 3 comprises an outer member or casing 1 which is preferably a stationary member, and an inner member 2 which is preferably the rotatable member or what is frequently referred to as the rotor. The casing comprises the circular member or hollow ring 3, lower head 4 and upper head 5. The heads are bolted to the ring 3 in the manner which is common in engine construction. A shaft 6 extends through the heads and the joint between the shaft and the head 5 is prevented from leaking by the usual packing and gland construction, 7 and 8. There is located within the lower portion of the casing a cam member 9, the function of which will hereinafter be described more in detail. This cam member 9 is provided with a depending flange that surrounds the shaft 6 and the leakage between the shaft 6 and the cam member 9 is prevented by the usual packing and gland construction 10 and 11, while the leakage from between the head 4 and cam member 9 is prevented by the packing 12 and gland 13.

The shaft 6 carries a hub 14 and from this hub there projects a number of vanes. Each of these vanes comprises a main portion 15 which is slotted at 16, and in this slotted portion there is located, so as to be free to slide therein, a member 17 which may be referred to as the movable portion of the vane. The movable portion 17 is continuously pressed downwardly against the upper surface of the cam member 9 by springs 18, and in order that the part 17 will remain in proper alinement a slot and key or feather construction is provided. The slot just referred to is indicated by the numeral 19 and a feather is indicated by the numeral 20. This movable member may be provided at the lower portion thereof, for example at the lower end of the feather, with antifriction rollers, as 18' (see Fig. 4). These rollers can be utilized as projecting bearing-surfaces to take the wear off of the movable portions or vanes 17 as they travel along the cam since a line contact of the movable portions with the cam is undesirable.

The main portions 15 of the vanes are shown integral with the hub 14 but it will be manifest that they may be separate members which are secured to the hub in any suitable manner. The vanes may also be reinforced as by braces 15' which are secured in place by bolts 15" that pass through the main portion 15 and also through slots 19' in the movable portions 17.

In order that the fluid passing through the casing may assist in moving or in holding the portions 17 against the upper surface of the cam, passage-ways may be provided in the main portions at X. These passage-ways lead to the space Y above the movable portions 17 and are provided with check valves Z that permit a flow of fluid only from the exterior of the vanes to the space Y.

The tops and ends of the main portion 15 are provided respectively with packings 21' and 21 and the bottoms and ends of the movable portions are provided with packings 21$^a$ and 21$^b$ which are similar in their action to the packing rings found in pistons of engines. In other words, the packings 21, 21', 21$^a$ and 21$^b$ serve to prevent the escape or flow of fluid through the spaces between the members of the movable member and the members constituting the casing. These packings also serve to counteract for wear and inequalities of the surfaces engaged by them and they serve to maintain the machine tight.

The cam member 9 is constructed so that all of the substantially radial elements of its upper surface extend horizontally and consequently as the rotor revolves the lower edge or lower part of the movable portion 17 can engage or at least almost engage the cam member and make a comparatively tight fit with the latter. As the rotor revolves the movable portion 17 of the vane which is shown at the left hand side of Fig. 2 will gradually be forced to the position of the movable portion of the vane shown at the right hand side of the figure, and it will be observed that in the latter position the lower edge of the portion 17 will rest on the surface along the line $m$ instead of along a surface which has the elevation of the line $w$. In other words the projecting vane has decreased in area as it has moved a certain angle—in the machine shown this angle is approximately 180°—but will assume its increased area when it has completed an entire revolution. The cam member 9 is provided with a circumferential packing 21.

The casing is provided with any suitable support or standard as S and with ports or openings 23 and 24 which communicate with spaces 25 and 26 having terminal orifices 25' and 26'. One of these ports or openings and its corresponding space may be considered as a supply port or opening, while the other port or opening and its corresponding space may be considered as as exhaust port or opening, since when an incoming fluid is being supplied to the mechanism through one of the openings an outgoing fluid will be passing from the mechanism to the other port or opening. When a fluid is being forced into the machine through the opening 23 it will cause the rotor to revolve because of the differential exposed areas of the vanes. The cam-shaped member 9 is provided with a handle 27 and by merely rotating the cam 9 through the medium of said handle the engine can be driven either forward or backward because this cam changes the relative position of the vane areas in respect to the inlet opening of the machine, or its speed can be otherwise modified by the cam as desired. Any suitable means, as the screw 27', can be utilized to secure the handle and hence the cam in adjusted position.

Figure 8:
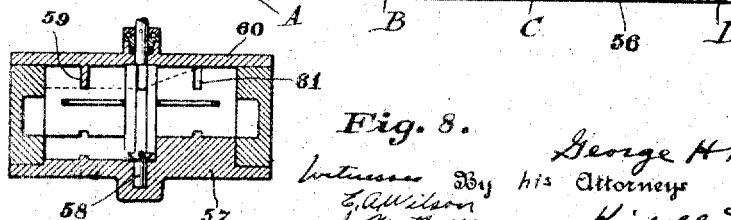
Fig. 8 is a vertical cross sectional view of another machine which embodies my invention.

This cam can be used also to calibrate the differential mechanism should it be desired to do so. While the cam 9 is shown as being movable and adjustable still it will be manifest that it may be considered as a part of the lower head 4 and in fact could be made an integral part thereof in case the user of the machine did not care to avail himself of the function of moving the cam. Such a construction is shown in Fig. 8. With a construction such as that shown in Fig. 8 the shaft need not project through the lower head thus eliminating packings and a possible source of leakage. Where the differential pressure mechanism is used in its generative sense, for instance as a steam engine, the control of the operative fluid or steam which is supplied to the interior of the casing could be regulated by any suitable governor, as for instance one which might be placed upon the supply pipe leading to the casing. The length of the hub or collar 14 is slightly greater than the distance between the under side of the head 5 and the lowest part of the upper surface of the cam 9 and this hub enters the counter-bored portions 5' and 9' in the upper head and cam member respectively. This serves to insure the rotor being properly positioned relative to the members which are counter-bored so as to receive the hub 14 of the rotor. The shaft 6 may also be provided with collars 28 and 29 on the inner sides of which may be located balls that receive thrust and serve to overcome the friction. These collars limit the longitudinal movement of the shaft and also tend to reinforce the heads 4 and 5. The shaft 6 in the construction shown in centrally located within the casing but in a broad sense the invention would be realized in a construction in which the movable portions of the vanes move radially outwardly, that is away from the shaft 6 instead of up and down, that is parallel with the shaft 6 as in the construction shown. While the movable portions 17 have been shown as straight still they might be constructed so as to be curved should occasion require.

Figure 5:
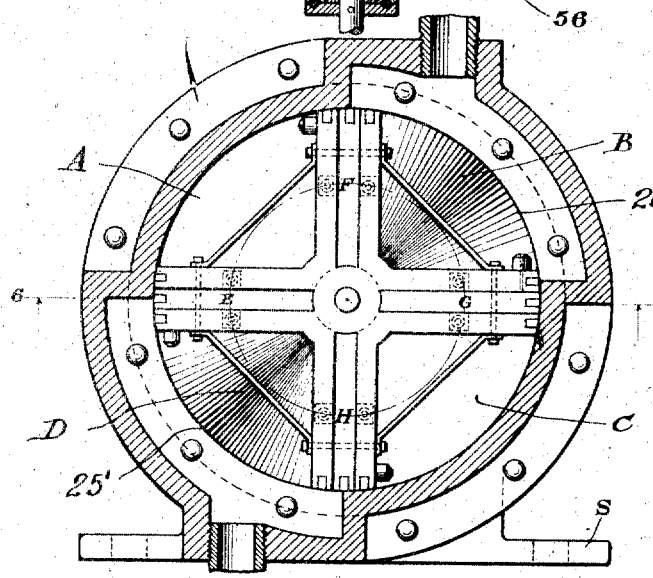
Fig. 5 is a horizontal sectional view of another form of mechanism embodying my invention. This is a view taken as on the line 5—5 of Fig. 6.
Figure 7:
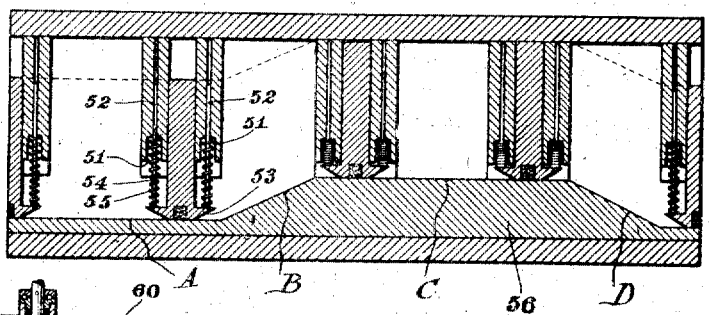
Fig. 7 shows a developed cross section of the cylinder and rotor taken as on the circular line E, F, G, H, E of Fig. 5.

The machine shown in Figs. 5, 6 and 7 is similar in its construction to that shown and described in connection with Figs. 1, 2 and 3 and this being the case it is believed that a detailed description of all of the parts of the machine shown in Figs. 5, 6 and 7 is unnecessary; certain features, however, will be referred to. The main portions of the vanes of the rotatable member of the mechanism are provided with a counterbored opening 51 and a comparatively long bore 52. The movable portions of the vanes are provided with laterally extending ears 53 from which there extends upwardly rods 54 that slide in the bored opening 52. Compression springs 55 surround these rods and the lower end of each of these springs is seated upon the upper side of a laterally extending ear 53; the upper portion of each of these springs is seated in the counterbored opening 51 and this spring mechanism just described constitutes a means for forcibly pressing the lower part of the movable portion of each vane toward the cam surface with which it coöperates. Each of the laterally extending ears 53 is inclined upward away from the movable portion from which it projects, thus forming a means whereby the movable portion of the vane can slide along the inclined portions of the cam without causing undue friction. The cam with which these movable portions of the vanes coöperate is designated by the numeral 56 and a developed section of this cam is clearly shown in Fig. 7. The cam 56 is shown as being movable relative to the lower head of the casing.

In Fig. 8 there is shown a machine which is similar to the machine shown in Figs. 1 to 7 inclusive. In Fig. 8, however, the cam at the lower part of the machine is shown as being integral with the lower head of the casing and consequently this cam is not adjustable relative to said head. This cam and head which are integral are designated by the reference character 57 and it will be noted that the shaft 58 of the machine shown in Fig. 8 does not extend through the head 57 but merely projects into a bored portion of the latter. When this construction is used a cam may be provided on the upper head of the machine (see for instance a cam such as is designated by the reference numeral 59 which is on the upper head 60) and this cam 59 is practically a counterpart of the cam portion of the member 57. Such being the case the cam 59 can be employed to force the movable part of the vanes downwardly toward or against the lower cam portion of the member 57, and in order that the cam 59 will not obstruct the movement of the rotor, openings 61 are provided in the upper portion of the main portion of the vanes that are on the rotor. If desired a movable cam similar to cam 59 could be employed in the form of machine shown in Figs. 1 to 7, but if employed with such machines it would be advisable to have the cam member 59 movable with the lower cam member, such as with the lower cam member 9 in the machine shown in Figs. 1 to 3, or the cam member 56 in the machine shown in Figs. 5 to 7.

The cam member 9 may be considered to have a low surface A, a gradual changing or cam surface B, a high surface C and a gradual changing or cam surface D. The surface A is arbitrarily referred to as the low surface since it is the surface which is the farthest removed from the main portion of each vane. In other words, when the movable portion is in engagement with this low surface the maximum area of the vane is exposed. The surface C is arbitrarily referred to as the high surface since this is the surface which is the nearest to the main portion of each vane. In other words, when the movable portion of a vane is in engagement with this high surface the minimum area of the vane is exposed.

The several surfaces of the cam member 9 are constructed so that at the time the movable portion 17 of a vane engages the low surface said movable portion does not move relatively to the main portion 15 of the vane and during the time that any particular vane is traveling over the low surface the maximum area of the variable vane is exposed to the fluid operating upon the vane or to the fluid which is operated upon by the vane. The high and low surfaces may be considered as unchanging surfaces since all portions of each of said surfaces are uniformly spaced from the main portion of a vane when said portion is moving opposite any one of said surfaces.

In a machine such as illustrated, in which the movable portion of each vane moves or slides axially and relatively to the main portion of the vane, the high and low surfaces are plane surfaces and are perpendicular to the axis of the rotor. When a vane is passing over the high surface C the movable portion thereof does not move relatively to the main portion and as previously indicated the minimum area of the variable vane.

is exposed to the fluid operating upon the vane or to the fluid being operated upon by the vane as the case may be. The movable portion of each vane moves relatively to the main portion only when the vane is passing from the high surface to the low surface and from the low surface to the high surface. This movement of the movable portion relative to the main portion takes place when the vane is moving over the cam surface B or cam surface D, as the case may be. These cam surfaces are in effect helical surfaces. If, for example, the motor is moving so that each vane successively engages and passes over the low surface A, cam surface B, high surface C and cam surface D then the movable portion of each vane is being positively pushed upwardly against the action of its springs by the cam surface B whereby the minimum area of the vane will be exposed when the vane reaches the surface C. The minimum area will remain exposed as the vane passes over the high surface C, and finally the movable portion will be forced downwardly by the springs against the cam surface D as the vane moves from the high surface C to the low surface D so that when the vane reaches the low surface A the maximum area will be exposed.

From an inspection of the drawings it will be readily observed that the cam or helical surfaces B and D are opposite the spaces 25 and 26 and particularly opposite the terminal orifices 25' and 26' through which the fluid passes on its way to or from the ports 23 and 24. The result is that the fluid exerts the same pressure upon opposite sides of each movable portion as said portion is moving relatively to the main portion; that is at the time the movable portion is passing over and in engagement with the cam surface B or cam surface D, as the case may be. During this time the particular vane in which the movable portion is being moved is not doing any work and there is very little friction between the movable and main portions of the vane. While the movable portion of the vane is being moved relatively to the main portion the movable portion may make only a line contact with the cam surface which it engages. When, however, any particular vane is doing work the area thereof is not changing and the portions of the vane which are adjacent or opposed to the casing—or the cam member in or of the casing—can make a surface contact with the casing and the cam member which it engages, thus resulting in a construction which will not readily leak steam. A cam member which is within the casing or a cam member which is a part of the casing may be broadly construed as a cam member on the interior of the casing. The cam surfaces B and D are preferably not quite coextensive with the length of the terminal orifices 26' and 25', as it is desirable to have all movements of the movable portion of the vane relative to the main portion take place while the balanced pressure is maintained on opposite sides of the vane the movable portion of which is being moved.

The differential pressure mechanism shown in the several figures of the drawings may be considered to have N number of radial vanes and in the construction shown N would equal 4 because there are four vanes. When the port 23 serves as an inlet then the port 24 would serve as an outlet or exhaust and it will therefore be seen that the required number of inlets is equal to $\frac{N}{4}$ and the required number of outlets or exhausts is equal to $\frac{N}{4}$. The terminal orifices 25' and 26' are each of a length approximately equal to $\frac{360°}{N}$. The low surface A extends over an angle at least as great as $\frac{360°}{N}$, the cam surface B extends over an angle not greater than that of the terminal orifice 26', to wit, not greater than $\frac{360°}{N}$, the high surface C is at least as great as $\frac{360°}{N}$, and the cam surface D extends over an angle not greater than that of the terminal orifice 25', to wit, not greater than $\frac{360°}{N}$.

It is apparent that the apparatus herein shown and described may be used as a pump, a motor, an engine or a meter without the necessity of specifically describing in detail such adaptation.

The differential pressure mechanism may be compounded if desired in a manner similar to that in which steam engines, air compressors or pumps are compounded today.

The differential pressure mechanism above described manifestly is adapted for use as an engine or when driven in a reverse direction as a pump. When used as a meter for example the shaft would be connected to a recording instrument. It is therefore manifest that the invention may be employed in various forms and that various changes might be resorted to without departing from the spirit and scope of the invention.

What I claim is:

1. A differential pressure mechanism of the class described comprising a casing having receiving spaces with terminal orifices, a rotor within said casing which rotor comprises vanes each having a main portion and a portion that moves relatively to the main portion, there being a cam member on the interior of the casing which cam member has high and low surfaces and a cam surface between each high and low surface, which cam surfaces do not extend beyond said terminal orifices whereby when a movable portion of a vane is being actuated by said cam the fluid passing through the mechanism will exert an equal pressure on opposite sides of the vane the movable portion of which is being moved.

2. A differential pressure mechanism of the class described comprising in combination a casing having therein fluid receiving spaces and terminal orifices through which fluid can flow from the receiving spaces to the interior of the casing or from the interior of the casing to the receiving space, a rotor within the interior of said casing which rotor comprises vanes each having a main portion and a movable portion, said differential pressure mechanism also having a cam member on the interior of the casing which cam member has high and low surfaces, said cam surfaces being arranged only opposite the orifices and the cam member being constructed so that as the movable portion of any particular vane is moved over and in engagement with the low surface or the high surface the movable portion will not move relatively to the main portion of the vane and so that when any particular vane is moving over any particular cam surface pressure on opposite sides of that particular vane will be maintained equal because of the terminal orifices extending to opposite sides of that particular vane while the movable portion thereof is in engagement with the cam surface.

3. A reversible pressure mechanism of the class described comprising in combination a casing having a movable cam member and a rotor within the casing, which rotor comprises vanes each having a main portion and a portion which moves relatively to the main portion whereby the exposed area of the vane can be varied, the movable portion of the vane being in engagement with the surfaces of the cam member, the casing having receiving spaces that are provided with terminal orifices which extend along a portion of the path of movement of the vanes, the cam member having high and low surfaces and cam surfaces between the high and low surfaces, which cam surfaces are located opposite the terminal orifices whereby when a movable portion of the vane is being moved relatively to its main portion when in engagement with a cam surface a balanced pressure will exist on opposite sides of that particular vane, the cam being constructed and arranged relatively to the terminal orifices so that when an unbalanced pressure is existing on opposite sides of any particular vane the movable portion of the vane will not be moved relatively to its main portion.

4. A rotary fluid device of the class described comprising an annular cylinder or casing closed at the top and bottom by two heads, a rotor contained within the cylinder having N radial vanes, said cylinder having $\frac{N}{4}$ inlet terminal orifices and $\frac{N}{4}$ exhaust terminal orifices all of which orifices subtend an arc of approximately $\frac{360°}{N}$, each vane of said rotor having a main portion and a portion movable relatively to the main portion, the casing of said fluid device having an interior cam member which is provided with $\frac{N}{2}$ plane surfaces that are perpendicular to the axis of the cylinder, part of which plane surfaces may be considered as high surfaces and the rest of which surfaces may be considered as low surfaces, the area of each of said surfaces being approximately equal to or as great as the area of a sector of a circle containing $\frac{360°}{N}$ which plane surfaces have between them an equal number of helical or cam surfaces, the cam surfaces being opposite to the terminal orifices.

5. A rotary fluid device of the class described comprising an annular cylinder or casing closed at the top and bottom by two heads, a rotor contained within the cylinder having N radial vanes, said cylinder having $\frac{N}{4}$ inlet terminal orifices and $\frac{N}{4}$ exhaust terminal orifices all of which orifices subtend an arc of approximately $\frac{360°}{N}$, each vane of said rotor having a main portion and a portion movable relatively to the main portion, the casing of said fluid device having on the interior thereof a cam member which is provided with $\frac{N}{2}$ plane surfaces that are perpendicular to the axis of the cylinder, part of which plane surfaces may be considered as high surfaces and the rest of which surfaces may be considered as low surfaces, the area of said surfaces being approximately equal to or as great as the area of a sector of a circle containing $\frac{360°}{N}$ which plane surfaces have between them an equal number of helical or cam surfaces, the cam surfaces being opposite to the terminal orifices, the cam member being movable angularly and relatively to the other members of the casing whereby the operation of the fluid pressure mechanism can be reversed.

6. A fluid pressure mechanism of the class described comprising in combination a casing having terminal orifices, a rotor having vanes the area of which can vary, said casing having on the interior thereof a movable cam member which is engaged with the movable portion of the variable vanes, which cam member can be positioned relative to the rest of the members in the casing whereby the differential pressure mechanism can be reversely operated.

7. A differential pressure mechanism of the class described comprising in combination a casing having terminal orifices and a rotor within said casing, the rotor having vanes comprising a main portion and a portion movable relatively to the main portion whereby the exposed area of the vane can be changed, the casing having a movable cam member which is engaged by the movable portions of the vanes so that as the vanes travel over the cam member the movable portions of the vanes can be positioned relatively to the main portion, the cam member being movable relatively to the terminal orifices.

8. In a differential pressure mechanism of the class described an annular cylinder having inlet and exhaust orifices, a rotor with N vanes, a cam member associated with the cylinder and coöperating with the rotor vanes, and cylinder heads secured to the cylinder, the cam member being adjustable relatively to the inlet and exhaust orifices of the cylinder, which cam member has $\frac{N}{2}$ plane surfaces perpendicular to the axis of the cylinder, part of which surfaces are in one plane and part of which surfaces are in another plane, the area of each of said surfaces being approximately equal to the area of a sector, of a circle, containing $\frac{360°}{N}$, the plane surfaces being interconnected by an equal number of helical or cam surfaces.

This specification signed and witnessed the 10th day of September, A. D. 1915.

GEORGE H. BOWEN, Jr.

Signed in the presence of—
MARGARET E. HARRIS,
FRED H. M. IRWIN.